United States Patent

[11] 3,571,523

[72] Inventor Eberhard Herter
Stuttgart, Germany

[21] Appl. No. 686,631
[22] Filed Nov. 29, 1967
[45] Patented Mar. 16, 1971
[73] Assignee International Standard Electric Corporation
[32] Priority Dec. 3, 1966
[33] Germany
[31] P 15 12 006.6

[54] RECEIVING DEVICE FOR DISTINGUISHING SUPERVISORY SIGNALS FOR OTHER AUDIOFREQUENCY SIGNALS
17 Claims, 3 Drawing Figs.

[52] U.S. Cl. .......... 179/84
[51] Int. Cl. .......... H04m 1/50, H04q 9/12
[50] Field of Search .......... 179/84 (UF)

[56] References Cited

UNITED STATES PATENTS 3,428,757 2/1969 Roscoe .......... 179/84(UF)

*Primary Examiner*—Kathleen H. Claffy
*Assistant Examiner*—William A. Helvestine
*Attorneys*—C. Cornell Remsen, Jr, Rayson P. Morris, Percy P. Lantzy, J. Warren Whitesel, Delbert P. Warner and Philip A. Weiss

ABSTRACT: Means are provided for automatically distinguishing supervisory signals from other audiofrequency signals in a telephone system. Supervisory signals are generally uniform, frequently being sine waves. These supervisory signals are distinguished from other audiosignals (which generally are not uniform) by determining each time the signals pass through two instantaneous amplitude levels to exceed successive reference levels of different amplitudes. This information is used to set and to store a bistable device, thereby producing evenly spaced pulses of even width. Other audiosignals, having eratic waveforms, cause the same bistable device to produce pulses which are not uniform in width and spacing.

Patented March 16, 1971 3,571,523

2 Sheets-Sheet 1

RECEIVING DEVICE FOR DISTINGUISHING SUPERVISORY SIGNALS FOR OTHER AUDIOFREQUENCY SIGNALS

The invention relates to a receiving device for distinguishing audiofrequency signals such as voice signals, from supervisory signals formed of a single signal frequency. It relates particularly to distinguishing such signals in telephone exchange systems.

In known receiving devices, supervisory signals and speech signals are distinguished from each other by audiofrequency receivers tuned to individual signal frequencies, or by counting the periods within a defined time. It is possible either way to determine whether a signal is formed of one signal frequency only. In case of a supervisory signal, the associated receiver responds. This type of evaluation requires a complete analysis of the signal received. This means that a complete receiving device of such a type must be associated with each line for the entire time during which such a signal may be expected.

A number of experiments have been made to reduce the expenditure on the receiving end per line in that the receivers are arranged centrally and are connected to the line to evaluate an arriving signal.

At such a centralization of receivers the problem is to assume that the receiver is requested only when a supervisory signal is at hand. If a central receiver were to be requested in case any arbitrary signal level is at hand, there would result too many dummy or erroneous seizings.

In the German printed application 1,049,438, an arrangement is shown in which a composed signal will be used. Via an audiofrequency presignal, a request for a central receiving device is derived per line. The central receiving facilities then evaluate the control signal following the presignal. This enables a reduction in expenditures on the receiving end per line, but this reduction is obtained on account of the stock of signals and of the transmission speed.

It is the object of the present invention to provide a receiving device whereby the expenditure per line on the receiving end can be reduced still further without impairing the stock of signals and the transmission speed. It is assumed that the supervisory signals consist always of one signal frequency.

The new receiving device comprises, according to the invention, a comparing unit on the receiving end firmly associated with each line. This comparing unit constantly compares the instantaneous value of the arriving signals with two different threshold values. Both threshold values are selected at a value and during a time interval in which both of said threshold values are expected to be exceeded an equal number of times if one signal frequency (supervisory signal) is at hand; whereas, if mixed frequencies are present a difference in the number of times the threshold value is exceeded will occur. The comparing units of the lines are scanned to find out the equal number of exceedings of both threshold values, and the lines are connected, with a central receiving circuit, if needed.

The comprising unit, provided per line, is very simple, nevertheless it assures that the central receiving circuit will be requested only if with a very high probability that a genuine signal or supervisory signal for evaluation is on the line.

The receiving device may be used, according to a further embodiment of the invention for audiofrequency signals which are formed each of an individual signal frequency out of several signal frequency groups. To this end, it must be provided that filters are firmly associated to the lines to separate the signal frequency groups and that the instantaneous values of the output signals of all signal frequency groups are compared over a comparing circuit each having two different threshold values.

If a supervisory signal has been registered via the comparing circuit, individually associated to each line, the evaluation can be made in that, as central receivers, audiofrequency receivers, tuned to the signal frequencies used, are provided or that the signal frequencies are determined via the scanning device by counting the number of times a threshold value is exceeded within a predetermined time.

There are different possibilities for setting the different threshold values which may be suitable depending on level fluctuations, signal frequency range and other characteristics. Both threshold values may be predetermined as constant magnitudes. In case of major level fluctuations it may be more useful to make both threshold values dependent on the input level of the signals, whereby the ratio of both thresholds is constant. In any case, both threshold values should show a minimum distance and their ratio should exceed a minimum value. In case of small level fluctuations, it is quite suitable to select zero as the first threshold value.

The comparing circuit arrangement consists, according to a further embodiment of the invention, of two comparing circuits which separately make the comparison with both threshold values. The two comparing circuits thereby control a bistable circuit stage in such a way that the bistable stage is set by the first comparing circuit when the first threshold value is exceeded and is restored by the second comparing circuit if the second threshold value is exceeded. If a genuine signal frequency or supervisory signal is applied, the excessions of both threshold values change. If on the other hand the same threshold value is exceeded twice it serves as a criterion of a frequency mixing, i.e., that no genuine signal is on the line. It is, therefore, provided that before the bistable circuit is actuated once more, a comparison is made in the position of the bistable and the control pulse of the comparing circuits. This comparison is made via AND circuits which are connected on the hand to the corresponding output of the bistable circuit stage and on the other hand to the output of the associated comparing circuit. In order to carry out this comparison, setting and restoring of the bistable circuit stage is delayed via timing or delay circuits. Characterizing the switching elements individual for each line, is made such that in each case of a twin actuation of the bistable circuit stage by the same comparing circuit via the AND circuit an indicator bistable stage is set, the switching condition of which characterizes no genuine signal at hand.

An additional safety when requesting the central receiving arrangement is achieved in that a level control device is provided which indicates the presence of a minimum signal level, and that via said level control device the indicator bistable circuit is set even if the minimum signal level is not reached.

The invention is described in detail with the aid of a receiving device for signals, formed each of an individual signal frequency out of two signal frequency groups, as shown in the drawings, wherein.

The receiving device according to the invention can be used where a supervisory signal has only one single signal frequency. This is the case at each 1-out-of-*n* signal code. A further application is possible for signals consisting each of a single signal frequency out of a plurality of signal frequency groups. In audiofrequency key dialing, e.g., a two-group code is used, whereby each signal consists of a signal frequency each out of the two groups, each group having four signal frequencies.

Figure 1:
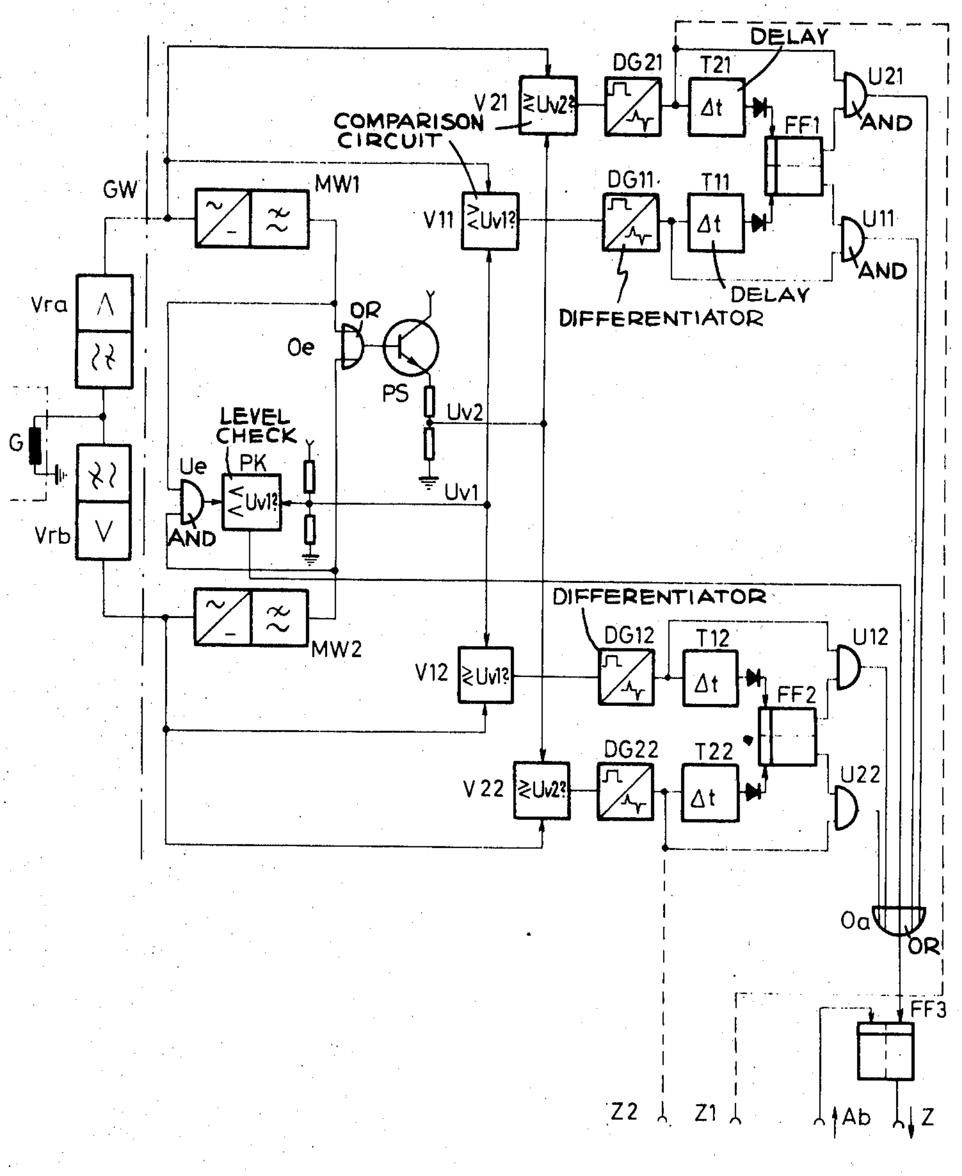
FIG. 1 shows the principle circuit arrangement of a receiving device according to the invention.

For such a group code the receiving device according to the invention can be arranged as shown in FIG. 1. A line is connected via preamplifiers Vra and Vrb to a group diverter GW. Via said group diverter GW the frequency band is separated into two signal frequency ranges so that at the outputs of the preamplifiers Vra and Vrb the conditions are the same as in a 1-out-of-*n* signal code.

In each signal frequency group the comparison of the instantaneous value is made with the two different threshold values $U_{r1}$ and $U_{r2}$. The level and the output of both signal frequency groups is supervised. Via the circuits MW1 and MW2 average values are formed which are applied, via an AND circuit Ue, to the level checking device PK. The level checking device PK checks, whether in both signal frequency groups the minimum level is exceeded. If this is not the case, the indicator bistable circuit FF3 is set via the level checking device PK and the OR circuit Oa. This bistable stage FF3 is cyclincally scanned. If said bistable circuit stage FF3 is set, no supervisory signal is on the associated line. When scanning via the input Ab, the bistable circuit stage FF3 is restored to normal, whereby a signal appears at the signal output Z.

The switching circuits MW1 and MW2 control, via the OR circuit Oe, a level-dependent threshold value circuit PS, the output voltage Uv2 of which depends on the level of the arriving signal. In the example shown a constant threshold value Uv1 and a level-dependent threshold value Uv2 have been selected.

Each group has two comparing circuits V11, V21 and V12, V22 respectively which compare the instantaneous values, at the output of the preamplifiers Vra and Vrb, respectively, with both threshold values Uv1 and Uv2. Both comparing circuits of a signal frequency group control, via differentiating elements DG11, DG21 and Dg12, DG22 respectively and via timing circuits T11, T21 and T12, T22 respectively, a bistable circuit stage FF1 and FF2, respectively. Actuation of these bistable circuit stages is selected so that, each time a threshold value is exceeded, the bistable circuit stage is triggered.

Figure 2:
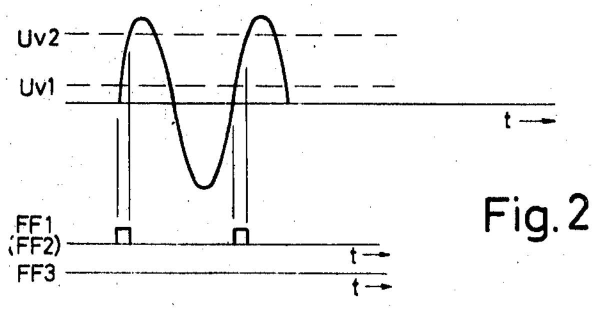
FIG. 2 shows a diagram to explain the switching processes, if a genuine signal frequency is at hand.

The mode of operation of the comparing circuit when a supervisory signal is applied will be explained with the aid of FIG. 2. At the output of the preamplifiers Vra and Vrb a single sinusoidal signal frequency is provided. When the threshold value Uv1 is exceeded, the bistable circuit FF1 is set; and when the threshold value Uv2 is exceeded, the bistable circuit FF1 is triggered back. The conditions are similar in the signal frequency group with the bistable circuit stage FF2.

Each time the threshold value is exceeded, the bistable circuit triggers over. This is an indication that a genuine signal, i.e. a supervisory signal, is on the line.

The level checking device PK releases the indicator bistable circuit stage FF3 via the OR circuit Oa.

At each triggering of the bistable circuit stages FF1 and FF2 a comparison is made which checks the position of the bistable circuit stage with the actuating pulse. This checking is made by the AND circuits U11, U21, U12 and U22, which are connected to an output of the bistable circuit stage FF1 and FF2 respectively and to the output of a comparing circuit V11, V21, V12, V22. These AND circuits now respond, if two actuating pulses are furnished over one and the same comparing circuit. As indicated in FIG. 2, this will not be the case if a sinusoidal signal is given. In such a case, no AND circuit responds. The indicator bistable circuit FF3 is, therefore not triggered. This is considered as an indication during scanning that a supervisory signal is to be evaluated.

Audiofrequency receivers, known per se, may then be connected to the outputs of the group hybrid. At the outputs Z1 and Z2 also the number of crossings of a threshold value, e.g. Uv2, may be counted within a predetermined time. Thereby, the frequency of the signal at hand can be found out, too.

Figure 3:
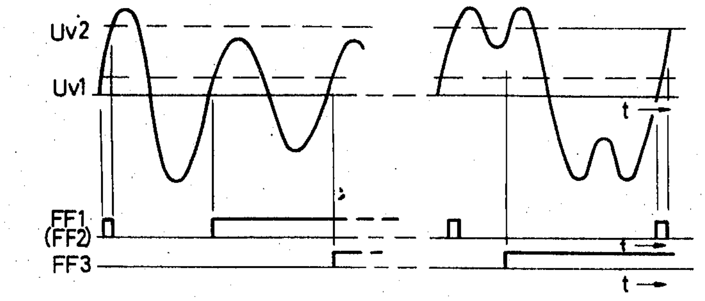
FIG. 3 shows a diagram to explain the switching processes, if a frequency mixture is on the line.

If mixed frequencies are at the output of the hybrid. as shown in FIG. 3, then excursions through both of the threshold values Uv1 and Uv2 do not occur regularly. At the first curve of the signal, the bistable circuit stage FF1 is set when the threshold value Uv1 is exceeded for the first time. At the following excursion of the threshold value to Uv2 the bistable circuit stage FF1 is triggered back. Now the threshold value Uv1 is exceeded again whereby the bistable circuit FF1 is operated again. The threshold value Uv2 is not exceeded so that at the next following excursion through the threshold value Uv1 a coincidence is found via the AND circuit U11 between the new actuating pulse and the wrong position of the bistable circuit FF1. Via the output signal of said AND circuit the indicator bistable circuit FF3 is set via the OR circuit 0a, indicating that no supervisory signal is at hand. It is therefore meaningless to say in which signal frequency group such a mixed frequency is at hand.

At the second curve of a signal according to FIG. 3 the bistable circuit FF1 and FF2 respectively is triggered, if the threshold value Uv1 is exceeded first. When the threshold value Uv2 is exceeded first the bistable stage FF1 is triggered back. Because then again an excession of the threshold value Uv2 is registered, the indicator bistable circuit FF3 is set. The setting is made by the AND circuit U21 or U22 respectively which finds the second actuating pulse of the comparing circuit V21 or V22 respectively with the wrong position of the bistable circuit FF1 or FF2, respectively.

The actuating pulses for the bistable circuits FF1 and FF2 are delayed via timing circuits t11, t21, t12, t22, in order to make such a comparison possible.

While the principles of the invention have been described above in connection with specific apparatus and applications, it is to be understood that this description is made only by way of example and not as a limitation on the scope of the invention.

I claim:

1. A receiving device for distinguishing supervisory signals formed at constant frequencies from other audiofrequency signals, comprising:
means for receiving signals;
means for providing reference voltages;
comparing circuits for comparing said signals and said reference voltage to detect when instantaneous values of the signals exceed the respective reference voltages;
a bistable circuit controlled by said comparing circuits to be set when a first reference voltage is exceeded and restored when a succeeding reference voltage is exceeded; and
said bistable circuit operating through additional means to provide a train of evenly spaced pulses when a supervisory signal is received and to provide a train of pulses of uneven length and varied spacing when other audiofrequency signals are received.

2. A receiving device as claimed in claim 1, in which:
said means for receiving signals includes filter means for separating received signals into separate signal frequency groups; and
means for applying the separate signal frequency groups to separate comparing circuits.

3. A receiving device as claimed in claim 1, in which the means for receiving signals includes audiofrequency receivers tuned to the signal frequencies of interest.

4. A receiving device as claimed in claim 1, in which:
differentiation circuits are provided between the comparing circuits and said bistable circuits to provide trigger pulses to said bistable circuits; and
means for connecting said differentiation circuits to output terminals from which a direct measurement of frequency of received signals can be taken.

5. A receiving device as claimed in claim 1, in which the means for providing reference signals includes means for providing constant signals at two threshold levels.

6. A receiving device as claimed in claim 5, in which the means for providing reference signals includes means for making the threshold levels depend upon the level of the received signals, whereby the relation of both threshold levels is constant.

7. A receiving device as claimed in claim 6, in which the means for providing reference signals maintains a minimum spacing between the threshold levels and maintains a minimum value for the threshold levels.

8. A receiving device as claimed in claim 5, in which the means for providing reference signals includes means for setting one threshold level at zero.

9. A receiving device as claimed in claim 1, in which:
two comparing circuits are supplied to separately make a comparison with reference voltages; and
each of said two comparing circuits actuates a separate bistable circuit.

10. A receiving device as claimed in claim 9, in which:

a bistable circuit is set by one comparing circuit when one threshold value is exceeded; and the bistable circuit is reset by the other comparing circuit when the second threshold value is exceeded.

11. A receiving device as claimed in claim 10, in which means are provided, operable prior to another actuation of the bistable circuit, for checking the position of the bistable circuit by comparing an output pulse of said bistable circuit with a control pulse of an associated comparing circuit.

12. A receiving device as claimed in claim 11, in which said means for checking the position of the bistable circuit includes AND circuits connected to the respective output of a bistable circuit and to the output of the associated comparing circuit.

13. A receiving device as claimed in claim 10, in which delay circuits are included between the respective comparing circuit and bistable circuit to set and reset the respective bistable circuit following a certain time delay.

14. A receiving device as claimed in claim 12, in which an indicator bistable circuit is connected to be set, when the bistable circuit is twice actuated by the same comparing circuit via the AND circuits, to indicate that no supervisory signal is present.

15. A receiving circuit as claimed in claim 14, in which the output signal of all AND circuits are connected to said indicator bistable circuit via an OR circuit.

16. A receiving circuit as claimed in claim 14, in which a level checking device is provided to indicate to the indicator bistable circuit the presence of the minimum reference voltage.

17. A receiving device as claimed in claim 16, in which the indicator bistable circuit is set via the level checking device even when the signal level passes below the minimum signal level.